INVENTORS
EDWARD SCHASCHL
BY GLENN A. MARSH

*Edward H. Long*

ATTORNEY

July 3, 1962 E. SCHASCHL ETAL 3,041,868
APPARATUS FOR TESTING LUBRICANTS
Filed Feb. 18, 1959 2 Sheets-Sheet 2

INVENTORS
EDWARD SCHASCHL
BY GLENN A. MARSH

*Edward H. Lang*
ATTORNEY

United States Patent Office 3,041,868
Patented July 3, 1962

3,041,868
APPARATUS FOR TESTING LUBRICANTS
Edward Schaschl and Glenn A. Marsh, Crystal Lake, Ill., assignors to The Pure Oil Company, Chicago, Ill., a corporation of Ohio
Filed Feb. 18, 1959, Ser. No. 794,017
12 Claims. (Cl. 73—10)

This invention relates to an apparatus for determining the performance characteristics of lubricants such as oils and greases designed to reduce wear between moving metal parts of machinery. More particularly, this invention pertains to the measurement of the attrition or wear of a surface moving in frictional contact with another surface, and especially pertains to the measurement of the wear electrically.

It is known to measure the wear of objects subjected to friction by determining the loss of weight or the decrease in the physical dimensions of the object tested. These methods have the disadvantage of lacking sufficient accuracy when the amount of material removed by the wear is small, as is generally the case, and of being applicable only after the completion of the wear test and not during the progress of the test. Such methods, subject to the limitations stated, may be used in evaluating the properties of a lubricant, by subjecting the test object to friction in the presence of the lubricant which is to be evaluated.

Briefly, this invention is directed to an apparatus which subjects a test element to friction and wear in the presence of a lubricant, and measures the wear on the test element electrically measuring the change in the resistance of said element. The change in resistance of the test element is approximately proportional to the quantity of metal removed.

It becomes, therefore, a primary object of this invention to provide a lubricant-testing device to be used with an electrical resistance-measuring circuit adapted to evaluate said lubricant by determining the change in resistance of a test element subjected to wear.

Another object of this invention is to provide a lubricant-testing apparatus in which the amount of metal removed by wear from a test element is determined electrically.

Another object of this invention is to provide a lubricant-testing apparatus in which the extent of wear of a test specimen can be determined from time to time during the progress of the test, without the necessity of removing the member subjected to wear from the co-operating apparatus.

Yet another object of this invention is to provide a device to determine the amount of metal removed from an unlubricated test element which is subjected to wear.

Still another object of this invention is to provide an apparatus for evaluating a lubricant by measuring the extent of wear of a lubricated test element, which provides means for automatically compensating for the error which would otherwise be introduced by a change in the temperature of the object subjected to wear. These and other objects will become apparent from the following description.

This invention is best described in reference to the drawings of which:

Figure 1:
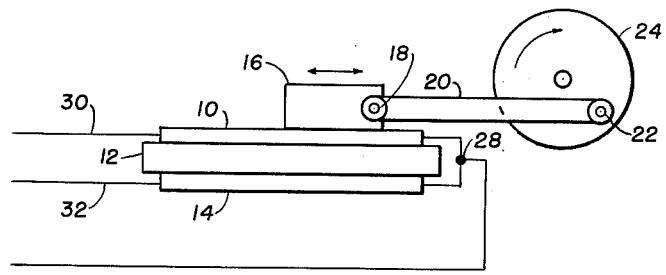
FIGURE 1 is an elevational view of an apparatus for subjecting a test element to sliding friction in the presence of a lubricant.

Referring to FIGURE 1, test element 10 is attached to and supported by support plate 12, which is preferably made from an electrically-insulating, heat-conducting material. Compensating element 14 is supported by the lower surface of support plate 12 in intimate contact therewith. Friction-block 16, which rests upon test element 10, is connected by pin 18 to link 20, which is in turn connected to crank-pin 22. Link 20 pivots at both pin 18 and crank-pin 22. Rotation of crank 24, which includes crank-pin 22, causes friction-block 16 to proceed back and forth across the surface of test element 10 with an oscillating motion. Test element 10 is coated with a lubricating composition to be evaluated. The friction between friction-block 16 and test element 10 causes test element 10 to wear. The rate of wear of the test element is of course a measure of the efficiency of the lubricant.

Figure 2:
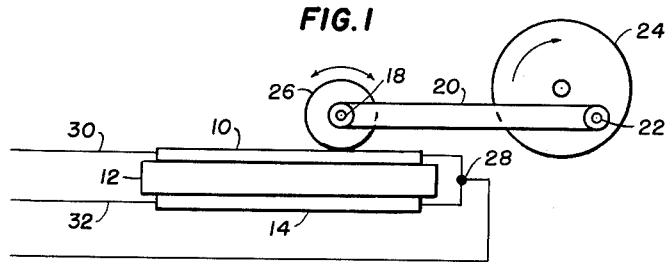
FIGURE 2 is a front elevation of an apparatus for subjecting a test element to rolling friction.

FIGURE 2 shows an alternate wear-producing device in which friction-block 16 is replaced by roller 26. Rotation of crank 24 subjects test element 10 to rolling instead of sliding friction.

Figure 3:
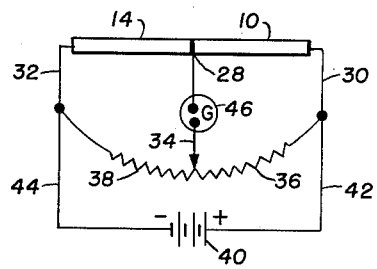
FIGURE 3 is a schematic diagram of an electric circuit for measuring a change in the resistance produced by wear of the test element. For purposes of clarity, the electrical-measuring circuit is shown separately from the wear-producing devices depicted in the figures, but it must be understood that the electric circuit is a necessary part of the apparatus shown in the other figures.
Figure 5:
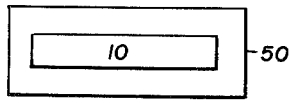
FIGURE 5 is a plan view of FIGURE 4.
Figure 4:
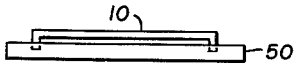
FIGURE 4 is an elevational view of a test element and a supporting insulating member.

FIGURE 3 is a schematic view of the electrical circuit used to measure the wear on test element 10. Test element 10 and compensating element 14 are electrically connected in series, either by physically joining the two elements or by joining them electrically by means of a conductor, such as conductor 28 shown in FIGURES 1 and 2. Conductors 30 and 32 are connected respectively to the other terminal ends of test element 10 and compensating element 14. These conductors connect the aforenamed elements to voltage divider 34, which together with the test elements forms a Wheatstone bridge. The four arms of the Wheatstone bridge consist of test element 10 and compensating element 14 which together form one branch, and portions 36 and 38 of voltage divider 34 which together form the second branch of the bridge. Voltage source 40, which may be a battery, is connected across the two branches of the bridge by conductors 42 and 44, to energize the circuit. Galvanometer 46 is connected between the junction of test element 10 and compensating element 14 and the moving terminal of voltage divider 34. Removal of metal by wear from test element 10 causes an increase in the resistance of this branch of the bridge circuit, which produces a corresponding proportional deflection of galvanometer 46.

Although it would be possible to measure the change in the resistance of test element 10 directly, as by an ohmmeter, this method is unsatisfactory because of the need for keeping the temperature of the test element at a known constant value. Instances will arise where the temperature may remain constant during the test period, or under some circumstances it may be possible to return a test element to its exact initial temperature after it has been subjected to wear. In such cases it will not be necessary to use the circuit of FIGURE 3. Instead, any accurate ohmmeter may be used to measure the resistance of the test element, and the compensating element may be omitted. In Table I are compiled resistance values at different temperatures for a coupon of steel, 0.125″ by 0.001″ x 3.0″. Also included are the variations in resistance of the same coupon of steel after a change in the resistance of the coupon has been produced by removal of metal from the coupon amounting to a weight loss of 10%.

*Table I*

|  | Temperature, F. | | | | |
| --- | --- | --- | --- | --- | --- |
|  | 0 | 32 | 68 | 85 | 100 |
| Resistance of coupon, in ohms | 0.0706 | 0.0807 | 0.0925 | 0.0980 | 0.1030 |
| Resistance of coupon after 10% weight loss, in ohms | 0.0785 | 0.0897 | 0.1029 | 0.1090 | 0.1145 |

It can be seen from these measurements that temperature has such a significant effect on resistance that lubricant evaluation studies employing resistance measurements are not reliable unless exact compensation is made for the variation in temperature occurring during the duration of the test. Such a test may last for days, or even weeks. Furthermore, the small changes that occur in the resistance of the test specimen as it is subjected to wear preclude ignoring the temperature factor as unimportant. Accordingly, this invention provides an electric measuring-circuit whereby automatic temperature compensation is provided which cancels the effect of temperature variations.

In the most basic application of this invention, two metallic elements are secured to the same supporting member so as to provide adequate transfer of heat between the test element and the temperature-compensating element. The test element is subjected to wear while the compensating element remains in its original condition. The specimens are serially connected to form separate resistances in one branch of a conventional Wheatstone-bridge network. The remainder of the bridge network, which in its simplest form consists of a second resistance branch in parallel with the aforenamed resistance branches, and the voltage source, provides a resistance-measuring instrument. The voltage divider in the second resistance branch of the bridge is connected through low-resistance leads 30 and 32 to the test element and compensating element.

In using the apparatus for lubricant evaluation studies, voltage divider 34 is adjusted until meter 46 shows that no current is flowing. At this point, the resistance of test element 10 can be determined by the following formula:

$$R_{10} = \frac{R_{14} R_{36}}{R_{38}}$$

By comparing the resistance measurements thus made with previously-prepared, calibrated tables, the loss of weight or loss of thickness caused by wear can be readily determined.

As a practical matter, it is possible to evaluate a group of lubricants by subjecting a series of identical test elements to wear in the presence of the various lubricants to be evaluated. Each test element should be made of the same material and have the same resistance characteristics. In each case, the voltage divider must be adjusted to give a zero galvanometer deflection at the beginning of the test. Each test specimen in turn is subjected to wear, the wearing process is discontinued, and sufficient time is allowed to elapse so that the test element and the compensating element will come to the same temperature. The elements of course need not, and in most cases will not, return to the exact temperature that existed before the test was begun. The extent of deflection of the galvanometer, after the elements have come to a common temperature, will be proportional to the amount of metal removed from each test element, respectively. By comparing the deflection of the galvanometer for each test element, the extent of wear, and therefore the usefulness, of each lubricant tested can be determined. The best lubricant will, of course, produce the smallest galvanometer deflection.

Any change in temperature brings about a change in the resistance of elements 10 and 14 in proportion to their individual resistances. The galvanometer in the bridge circuit of FIGURE 3 will show no deflection if elements 10 and 14 are at the same time proportionally increased or decreased in resistance. Therefore, element 14 compensates element 10 for changes of temperature. It is important that the two elements be at the same temperature at the time the measurements are taken and when the bridge is initially adjusted to give a zero galvanometer deflection. Thermoelectric effects at the junctions between test element 10 and compensating element 14 and the lead wires to the bridge are minimized by the fact that as long as the elements are both made of the same material, and the conductors are both made of the same material, preferably copper, the thermoelectric effects will be compensating and cancel each other.

Although the apparatus is suitable for use in the simplest form described above, it is preferred that some expedient be provided which will permit the direct reading of loss of metal thickness by wear without the need for referring to previously calibrated tables. Lynn E. Ellison, in U.S. Patent 2,830,265, describes an electric resistance-change meter for conveniently detecting and measuring changes in resistance, which will provide a direct reading of the rate of the wear. The meter of Ellison employs a bridge circuit similar to that shown in FIGURE 3, in conjunction with relatively complex electronic circuits to accomplish his purpose. Elements 10 and 14 may be connected to the electric resistance-change meter of Ellison in the same way that they are connected in the bridge circuit of FIGURE 3. The temperature-compensation function of both measuring circuits is identical.

The test element and the compensating element will preferably have substantially the same resistivity, which means they will have substantially the same chemical composition. Although advantages accrue in constructing the test specimens from materials having the same resistance values, suitable unsymmetrical elements can be fashioned in which the resistance of these elements is not identical, provided, for the sake of consistency, a material of construction is employed which is substantially uniform in composition and resistivity. In general, the resistance of the test element to the resistance of the compensating element, expressed as a ratio, may vary from values of about 0.1 to 10. Although the values of these ratios of resistances may vary over wide limits, it is well known to those skilled in the art that as a practical matter there are numerous electrical factors which have to be taken into consideration in the design of suitable resistance elements. Of primary importance is the factor of temperature compensation. By using test elements which have substantially the same resistivity, the test probe will function accurately when connected to the bridge-measuring circuit without the necessity for tedious calibration.

Because the sensitivity of the measuring instrument is related to the original thickness of the test specimen, the first step in selecting proper test-element dimensions is to ascertain the minimum metal loss to be detected. Then, knowing the sensitivity of the instrument in relation to initial thickness, the requisite initial thickness can be determined. For example, when the minimum detectable metal loss is to be 10 microinches, using an instrument sensitive to 0.02% of the original metal thickness, the test element must be $10 \times 10^{-6}$ divided by 0.0002, or $5 \times 10^{-2}$ (0.05) inch thick. When the thickness has been established, the length-to-width ratio of the element is dictated by the total-element resistance at which the instrument is to operate.

The electric resistance-change meter described by Ellison in the aforenamed patent operates well with test elements and compensating elements having resistances within the range of 0.08 to 0.2 ohm, and therefore a resistance of 0.1 ohm is convenient when Ellison's instrument is to be used. The length-to-width ratio can then be calculated as follows:

$$R = P\frac{L}{A} = P\frac{L}{W \times T} = \frac{10^{-5}}{2.54} \times \frac{L}{W \times 0.050} = 0.1$$

$$\frac{L}{W} = \text{about } 1000$$

where $R$ = total resistance of the element.
$P$ = specific resistance of the element ($10^{-5}$ ohm-cm. for steel).
$L$ = length of the element.
$A$ = cross-sectional area of the element.
$W$ = width of the element.
$T$ = thickness of the element.

In this example, the length of the test element and the compensating element would be made 1000 times the width.

Figures 6, 7:
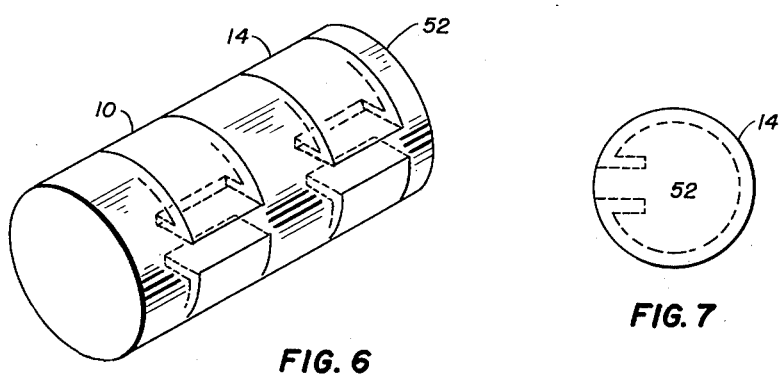
FIGURE 6 is an isometric view of a cylindrical test element supporting member.
FIGURE 7 is an end view of the device of FIGURE 6.

FIGURES 4 through 7 show various preferred methods of mounting and supporting the test elements and compensating elements. Test element 10 is preferably cast in place in an electrically-insulating, heat-conducting, rectangular support-member 50. A compensating element may be cast in a similar supporting member, and the two members fastened together back-to-back to afford adequate heat transfer from the test element to the compensating element. Alternatively, the test element and compensating element may be cast in opposite faces of the same support member. FIGURE 6 shows two elements 10 and 14 cast circumferentially around a cylindrical support-member. Alternatively, one or both elements might be cast so as to protrude from the interior surface of a cylindrical sleeve. In either event, a sleeve and a mating cylinder may be used to produce an environment of wear similar to that which exists between a bearing and journal.

Figure 8:
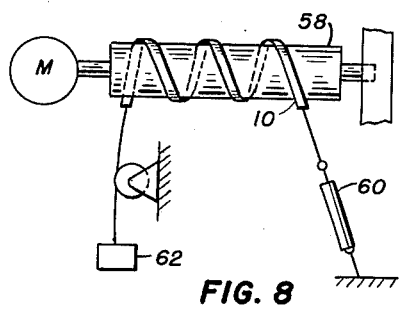
FIGURE 8 is an elevational view of an alternate structure for subjecting a test element to wear.

FIGURE 8 shows a test element wrapped around a motor-driven cylindrical drum 58. The test element 10 is kept under tension between spring scale 60 and weight 62. Drum 58 is coated with the lubricant to be tested. The deflection of scale 60 will measure the wear-producing torque applied to the test element.

Figures 9, 10:
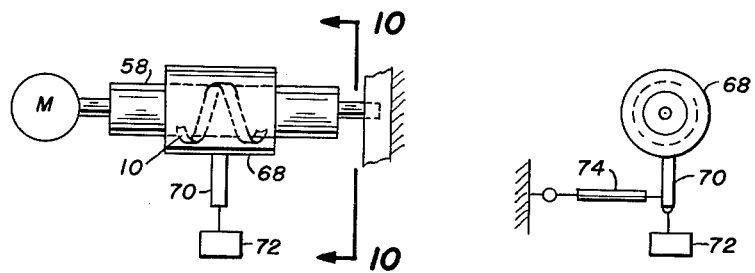
FIGURE 9 is an elevational view of another alternate apparatus for subjecting a test element to wear.
FIGURE 10 is a side elevation of FIGURE 9 including means for subjecting the test element to a predetermined load, and means for measuring the wear-producing frictional force applied to the test element.

FIGURES 9 and 10 show motor-driven drum 58 which is encompassed by the element-supporting sleeve 68. Test element 10 is cast in place on the interior circumference of sleeve 68, which is preferably formed of an electrically-insulating, heat-conducting plastic. It must be understood that test element 10 may be wrapped around the interior surface of the sleeve any desired number of times depending upon the length of the test element. For example, where the element has a very high ratio of length-to-width, say a ratio of 1000, the element may be made an ⅛" wide and therefore about 125" long. If drum 58 has a diameter of 7", it is necessary that the test element make about 5 complete turns around the inside of sleeve 68. The test element should protrude sufficiently from the inside surface of the sleeve so that the test element, rather than the sleeve, will contact the rotating drum. Arm 70 extends vertically downward from the sleeve, and may be equipped with suitable weights or other means for applying the desired bearing load. The deflection of scale 74 will indicate the total torque applied as friction against the test element. The running surface between the test element and drum 58 is coated with the lubricant to be evaluated. The compensating element, not shown, is preferably cast within the interior of sleeve 68; adjacent to the exterior surface of the sleeve. In this way good heat conductivity between the test element and compensating element is obtained, so that when the application of friction is discontinued, the two elements quickly come to the same temperature and a dependable resistance-change reading can be taken. The two elements will probably not come to their original temperatures, but this is not important so long as the elements are at a common temperature when the readings are made.

By means of the device of FIGURES 9 and 10, the test element may be subjected to any desired friction load by increasing weight 70. The corresponding increase in the torque-producing friction can be noted at scale 74. Throughout the duration of any one lubricant evaluation test, it may be desired to stop the motor, allow the two test elements to come to equal temperature, and made a wear-measurement reading. Thus, the actual condition of wear at any time during the duration of the test can be obtained. Drum 58 is preferably coated with a non-conducting material, so that contact between the test element and the drum will not produce erroneous resistance readings. In the alternative, sleeve 68 may be slid axially off the drum before the reading is made, and then reinstalled around the drum after the measurement has been taken.

While this invention has been described with respect to the several specific embodiments depicted in the drawings, it must be understood that it is not intended to be so limited. Other methods of producing friction or wear will be obvious to those skilled in the art. Modifications of electrical circuits which may be employed with the test element and compensating element of this invention, will also be apparent. Such equivalent mechanical structures and electrical devices are within the scope of this invention.

In general, it is advantageous to use very thin test elements since a given metal loss will result in a higher percent resistance change if the element is made thinner. In addition, the thinner element need not be as long to have the desired total initial resistance. Elements of convenient size can be made by plating processes in which a metal film 0.0001 to 0.01 inch thick is bonded to an electrically-insulating support.

What is claimed is:

1. A lubrication tester comprising, in combination, an electrically-conductive abradable element, a second element having a temperature-resistance characteristic similar to that of the abradable element, means supporting said elements in an electrically-insulated, thermally-connected relationship, means for subjecting said abradable element to mechanical friction in the presence of the lubricant to be tested, and electrical means for measuring the change in the ratio of the resistance of the abradable element to the resistance of the second element.

2. An apparatus according to claim 1 in which said electrical means is a bridge circuit having four serially-connected arms, said elements being connected in two mutually adjacent arms of said circuit, other resistances connected in the other two arms of said circuit, means for measuring electrical potential connected between two opposite corners of said circuit, and a current source connected between the two remaining corners of said circuit, said corners being defined by the junctures of said four arms.

3. An apparatus according to claim 2 including means for varying the normal force exerted by said friction-producing means against said abradable element.

4. An apparatus according to claim 2 in which said abradable element has a high ratio of length to cross-section.

5. An apparatus according to claim 4 in which said element is a thin metal film plated on an electrically-insulating support.

6. An apparatus according to claim 4 in which said friction-producing means includes a member engageable with said abradable element and movable over a substantial part of the length of said abradable element.

7. An apparatus according to claim 6 in which said member is a roller.

8. An apparatus according to claim 2 in which said friction-producing means includes a rotatable drum, and said abradable element is supported in contact with the circumference of said drum by the interior surface of a sleeve member which encompasses said drum.

9. An apparatus according to claim 8 including means for measuring the friction-producing torque applied to said abradable element.

10. A method for evaluating a lubricant comprising measuring the electrical resistance of an abradable element, subjecting said element to friction in the presence of the lubricant to be evaluated, and again measuring the electrical resistance of said element.

11. A process according to claim 10 including the step of returning the element to its initial temperature before again measuring the electrical resistance of said element.

12. A method for evaluating a lubricant comprising, measuring the ratio of the electrical resistances of two elements, subjecting one of the elements to friction in the presence of the lubricant to be evaluated, and again measuring the ratio of the electrical resistances of the two elements, the elements being at substantially equal temperatures when said resistance-ratio measurements are taken.

References Cited in the file of this patent

UNITED STATES PATENTS

| | | |
|---|---|---|
| 2,337,414 | Rieber | Dec. 21, 1943 |
| 2,485,579 | Elliott | Oct. 25, 1949 |
| 2,609,644 | Brown et al. | Sept. 9, 1952 |
| 2,830,265 | Ellison | Apr. 8, 1958 |
| 2,872,805 | Cochran | Feb. 10, 1959 |
| 2,970,411 | Trolander | Feb. 7, 1961 |